April 11, 1950            J. C. WILLIAMS            2,503,533
PROCESS OF MAKING BEARINGS
Filed Sept. 15, 1945
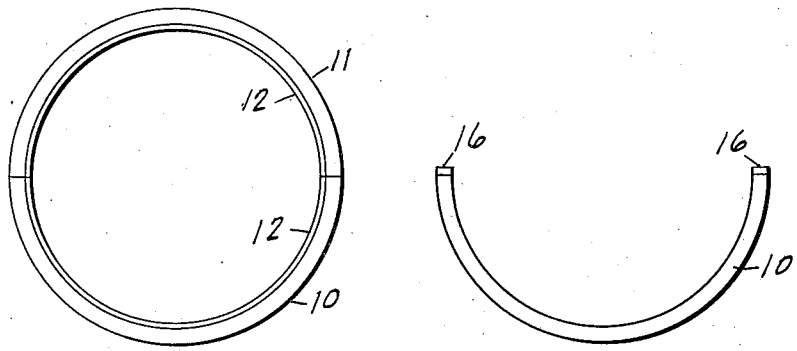
Fig. 1.          Fig. 2.
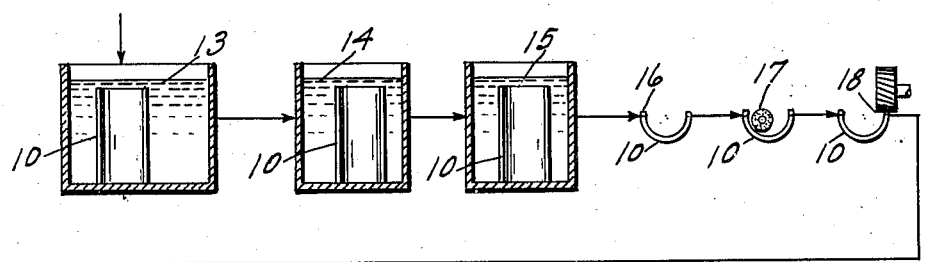
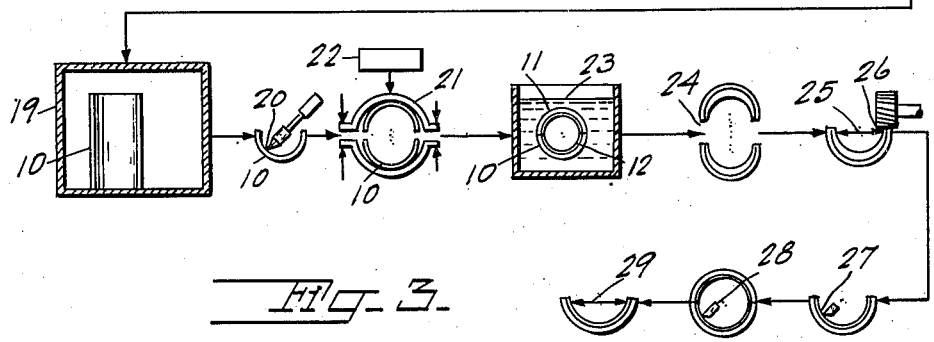
Fig. 3.
Inventor
John C. Williams
By Philip V. Friedell
Attorney Patented Apr. 11, 1950

2,503,533

UNITED STATES PATENT OFFICE 2,503,533

PROCESS OF MAKING BEARINGS

John C. Williams, Oakland, Calif.

Application September 15, 1945, Serial No. 616,642

1 Claim. (Cl. 29—149.5)

This invention, a process for applying bearing metal to bearing shells, is herein described with reference to the reconditioning of the connecting rod bearings of locomotives, but is not so limited, being adaptable to other types, including new or used bearings. This process was originally designed for locomotive bearings and particularly the connecting rod bearings because of the acute shortage, the inability of the rail lines to have their demands for these bearings met; that shortage being principally due to excessive transportation demands, and to the high ratio of rejects which result through conventional processes of reconditioning.

In the conventional processes used for reconditioning these connecting rod bearings, blisters, blow-holes, and density variations, along with improper bonding, are encountered, the blisters and blow-holes being immediately detectable and being the causes of the greater number of rejections, while improper bonding often cannot be detected, and only becomes apparent when the liner gives away and the connecting rod starts pounding.

This invention was evolved to overcome all of these faults and reduce the number of rejects to an absolute minimum and thus increase production so that the railways of the nation will be properly supplied, particularly during these times when every piece of equipment is vitally needed. These bearings, because of the high unit pressures reciprocally applied and the high bearing speeds, must be accurate, with a liner which is perfectly bonded, of uniform density, homogeneous, free of blisters, blow-holes, and foreign material. These conditions are met in only about three out of ten bearings reconditioned by existing methods, in spite of all the care taken in cleaning and casting-in the liner.

My process involves a new method of cleaning, of handling during lining, of lining and finishing, with a specific arrangement of steps which assures success, with a practically 100% output of perfectly-reconditioned bearings, thus alleviating the serious shortage and providing for more efficient operation and thus making more locomotives available for maximum traffic. And with new bearings, the best bearing quality and longest life is assured.

The objects and advantages of the invention are as follows:

First, to provide a process whereby locomotive bearings can be accurately reconditioned with an absolute minimum of rejects.

Second, to provide a process whereby the new bearing liner is free of bubbles, blow-holes, blisters and inclusions.

Third, to provide a process which provides bearings in which the liners are perfectly bonded to the shell.

Fourth, to provide a process which produces a homogeneous, dense bearing liner, perfectly bonded to the shell.

In describing the invention references will be made to the accompanying drawings in which:

Fig. 1 is a diametric section through a locomotive connecting rod bearing.

Fig. 2 is a similar section through one half-shell with the liner removed.

Fig. 3 is a flow sheet of the process of reconditioning the bearing and shows the process as applied to one half-shell, the same process being equally applicable to new bearings.

The conventional locomotive bearing consists of a pair of half-shells 10 and 11 each of which is provided with a liner 12 of Babbitt or similar bearing metal. This liner must be perfectly bonded to the shell, must be homogeneous, and must be free of defects of any kind. One conventional method of casting these liners in place is to cast them around a mandrel centered within the assembled half-shells. This often results in various imperfections, such as poor bonding, blisters, occlusions and inclusions, and low and uneven densities.

In my new improved process, the liner is perfectly bonded and free of all imperfections, and consists, in the case of reconditioning old bearings, in a new method of cleaning the shell, the building up of the parting strips, spreading of the shells during casting of the liner, centrifugal casting of the liner with a measured quantity of lining material, the finishing, and the final spreading of the shell, to provide a bearing perfect in all respects. With new bearing shells, obviously no build-up of parting strips or removal of old liner material is involved.

Referring to Fig. 3, the bearing shell 10 is placed in a furnace or crucible, with or without a bath of molten material 13, which bath, if used, can be of a material similar to that from which the lining is made, and can consist of the accumulation of metal from these bearings to be reconditioned, or may consist of a suitable molten chemical compound brought to proper heat to melt all of the lining metal out of the shell.

After the liner has been removed from a used shell, or with a new shell, the shell is boiled in a 0.4–0.7, preferably a 0.5% solution or five grams of oxalic acid per liter of water 14, for five minutes which clears the shell of all detrimental substances. The shell is then thoroughly washed in clean cold water 15, and dried. This portion of the process is separately disclosed and claimed in my copending application, Serial No. 616,643, filed September 15, 1945, now forfeited.

With used bearing shells, parting strips 16 are next applied, and may consist of a silver alloy or other suitable material, resorting to suitable thermal means such as brazing or welding.

The inside of the shell is next ground as indicated at 17 and the parting strips (or in the case of new shells, the parting surfaces) rough-finished oversize, as indicated at 18, about 0.010 to .015 inch for an 8½ inch bearing. This forms an oval opening through a pair of assembled shells with a major diameter .020 to .030 greater than the minor diameter.

The shell is then heated in an oven or in a suitable molten bath as indicated at 19 and heated to a temperature of 550° F. When thoroughly heated, the bore is tinned, indicated at 20, the tinning being manually performed to assure thorough tinning of the bore, using a suitable flux.

As soon as the tinning is completed and while the shell is still warm, it is placed in a jig along with its companion shell as indicated at 21 and the pair of shells clamped therein. The temperature of the jig with its assembly of shells is gradually raised to a suitable temperature, above the melting point of the liner material (to about 900° F., for conventional anti-friction material—a type of babbitt now used). The jig is rotated at a speed corresponding to about 1800 feet per minute for the inside periphery of the shells, the lining material is introduced preferably in a molten state, indicated at 22 and the heating continued until the lining material smoothly covers the entire inner periphery of the shells. The heating is then discontinued but spinning is continued until the lining material begins to set. The jig is then stopped, the bearing with its initial-set liner is removed and is then heat treated by suddenly quenching in cold water as indicated at 23 to produce a homogeneous structure of uniform density and increased hardness, and to maintain the instant internal structure existing at the time of initial setting of the bearing metal. The half-shells are then broken apart as indicated at 24.

The half shells are then spread as indicated at 25 .010 inch over the normal outside diameter, and while spread, the parting strips are machined as indicated at 26 to .005 inch oversize, taking off .005 to .0075 inch from the rough-finished strips, after which the bearing is rough-bored as indicated at 27 about 1/16 inch under-size. Then, when the two half-shells are assembled, the bore will be substantially oval and about .010 inch greater in depth than in width, or with the major diameter .010 inch in excess of the minor diameter, and with the parting strips having inwardly-inclined faces to compensate for final spreading.

The bore is then finished to size as indicated at 28, suitable oil passages and relieves being formed in the lining for lubrication, and as a final step, the half-shells are given a permanent spread as indicated at 29 of about .010 inch for an 8½ inch bearing previously mentioned, or about .001 to .0015 inch per inch diameter of bore, so that, when assembled in a bearing housing and clamped, the shells will be held under compression, and the clamping of the bearing will simultaneously secure the bearing and return the bore to the exact required diameter, and with the inside face of the liner under compression, adding to the density imparted through the spinning and quenching of the metal, and resulting in a bearing of the highest possible quality and life.

I claim:

The method of forming bearing half-shells consisting in building up parting strips on the respective halves of the shell, rough-finishing the parting strips oversize, assembling the halves, molding a liner in the assembled half-shells with an undersized bore, breaking the halves apart, spreading each half diametrically to slightly semi-elliptical form, finishing the faces of the parting strips of the spread halves slightly oversize, releasing the halves to return to normal diameter and finishing the bore to size, and thereafter permanently spreading each half diametrically, for forcing to normal diameter through compression into a bearing housing to immovably secure the bearing shell therein.

JOHN C. WILLIAMS.

REFERENCES CITED

The following references are of record in the file of this patent:

UNITED STATES PATENTS

| Number | Name | Date |
|---|---|---|
| 1,333,337 | Pack et al. | Mar. 9, 1920 |
| 1,440,559 | Sharpe | Jan. 2, 1923 |
| 1,516,089 | Eggenweiler | Nov. 18, 1924 |
| 1,783,438 | Landers | Dec. 2, 1930 |
| 1,994,461 | Pike | Jan. 23, 1930 |
| 2,294,886 | Angel | Sept. 8, 1942 |
| 2,364,503 | Zink | Dec. 5, 1944 |

OTHER REFERENCES

Amer. Mach. Handbook, 7th Add., pp. 203–205, Calvin & Stanley, 1940.

Uses and Applications of Chemicals, p. 429, Gregory, Reinhold, 1939.